(12) United States Patent
Lee

(10) Patent No.: US 11,647,167 B2
(45) Date of Patent: May 9, 2023

(54) WEARABLE DEVICE FOR PERFORMING DETECTION OF EVENTS BY USING CAMERA MODULE AND WIRELESS COMMUNICATION DEVICE

(71) Applicant: INHANDPLUS INC., Pohang-si (KR)

(72) Inventor: Hwiwon Lee, Seoul (KR)

(73) Assignee: INHANDPLUS INC., Pohang-si (KR)

( * ) Notice: Subject to any disclaimer, the term of this patent is extended or adjusted under 35 U.S.C. 154(b) by 0 days.

(21) Appl. No.: 17/518,615

(22) Filed: Nov. 4, 2021

(65) Prior Publication Data

US 2022/0060666 A1 Feb. 24, 2022

Related U.S. Application Data

(63) Continuation of application No. PCT/KR2020/006008, filed on May 7, 2020.

(30) Foreign Application Priority Data

May 7, 2019 (KR) .................. 10-2019-0053276

(51) Int. Cl.
*H04N 7/18* (2006.01)
*H04W 4/80* (2018.01)
(Continued)

(52) U.S. Cl.
CPC ............. *H04N 7/188* (2013.01); *G04G 21/02* (2013.01); *G06V 40/20* (2022.01); *H04B 1/385* (2013.01);
(Continued)

(58) Field of Classification Search
CPC ...... H04N 7/188; H04N 5/2257; H04N 7/185; H04W 4/80; G06V 40/20; G04G 21/02; H04B 1/385
(Continued)

(56) References Cited

U.S. PATENT DOCUMENTS 9,860,517 B1 * 1/2018 Ramaswamy ..... H04N 5/23241
10,025,908 B1 7/2018 Orellano et al.
(Continued)

FOREIGN PATENT DOCUMENTS

CN 106030676 A 10/2016
JP 2004-280376 A 10/2004
(Continued)

OTHER PUBLICATIONS

International Search Report of PCT/KR2019/001118 dated May 8, 2019.

(Continued)

*Primary Examiner* — Rebecca A Volentine
*Assistant Examiner* — Matthew David Kim
(74) *Attorney, Agent, or Firm* — Revolution IP, PLLC

(57) ABSTRACT

According to one embodiment of the present disclosure, there can be provided a monitoring system comprising a wireless communication device configured to be attached to an object containing medication, including a motion sensor, an ambient light sensor, and a first controller; and a wearable device configured to be worn by a user, including a camera, and a second controller; wherein the first controller is configured to provide an activating signal related with the activation of the camera of the wearable device when a predetermined condition is satisfied, and wherein the second controller is configured to receive the activating signal and determine whether activating the camera or not based on the activating signal.

10 Claims, 11 Drawing Sheets

(51) Int. Cl.
*G06V 40/20* (2022.01)
*G04G 21/02* (2010.01)
*H04B 1/3827* (2015.01)
*H04N 23/57* (2023.01)

(52) U.S. Cl.
CPC ............. *H04N 7/185* (2013.01); *H04N 23/57* (2023.01); *H04W 4/80* (2018.02)

(58) Field of Classification Search
USPC ........................................................ 348/158
See application file for complete search history.

(56) References Cited

U.S. PATENT DOCUMENTS

| | | | |
|---|---|---|---|
| 2013/0199660 A1* | 8/2013 | Cun ........................ | B60L 50/72 141/94 |
| 2013/0267794 A1 | 10/2013 | Fernstrom et al. | |
| 2015/0215443 A1 | 7/2015 | Heo et al. | |
| 2015/0216413 A1 | 8/2015 | Soyao et al. | |
| 2015/0363570 A1 | 12/2015 | Hanina et al. | |
| 2016/0027284 A1* | 1/2016 | Kamp ................... | G06Q 20/327 340/686.6 |
| 2016/0055316 A1 | 2/2016 | Jafari et al. | |
| 2016/0287166 A1 | 10/2016 | Tran | |
| 2016/0306932 A1* | 10/2016 | Fateh ....................... | G06F 3/017 |
| 2016/0354283 A1* | 12/2016 | Cho ....................... | A61J 7/0076 |
| 2017/0004283 A1 | 1/2017 | Lewis | |
| 2017/0111565 A1* | 4/2017 | Shibahara ........... | H04N 5/23206 |
| 2017/0263113 A1 | 9/2017 | Tiberi et al. | |
| 2018/0132783 A1 | 5/2018 | Wang et al. | |
| 2019/0065970 A1 | 2/2019 | Bonutti et al. | |
| 2019/0385717 A1* | 12/2019 | Guan ................. | G06K 9/00375 |
| 2021/0058590 A1 | 2/2021 | Lee | |

FOREIGN PATENT DOCUMENTS

| | | |
|---|---|---|
| JP | 2015-033052 A | 2/2015 |
| JP | 2015-126451 A | 7/2015 |
| JP | 2015-197803 A | 11/2015 |
| JP | 2016-091567 A | 5/2016 |
| JP | 2017-169732 A | 9/2017 |
| JP | 2018-506404 A | 3/2018 |
| JP | 6435595 B2 | 12/2018 |
| JP | 2019-213886 A | 12/2019 |
| KR | 10-2015-0088599 A | 8/2015 |
| KR | 10-2016-0008448 A | 1/2016 |
| KR | 10-2016-0099435 A | 8/2016 |
| KR | 10-2016-0104288 A | 9/2016 |
| KR | 10-2016-0108051 A | 9/2016 |
| KR | 10-2016-0120131 A | 10/2016 |
| KR | 10-2016-0131790 A | 11/2016 |
| KR | 10-2017-0054861 A | 5/2017 |
| KR | 10-2017-0084657 A | 7/2017 |
| KR | 10-2017-0112704 A | 10/2017 |
| KR | 10-1798890 B1 | 11/2017 |
| KR | 10-2018-0028701 A | 3/2018 |
| KR | 10-2018-0054453 A | 5/2018 |
| KR | 10-2018-0084576 A | 7/2018 |
| KR | 10-1949102 B1 | 2/2019 |
| KR | 10-2019-0067686 A | 6/2019 |
| KR | 10-2019-0125143 A | 11/2019 |
| KR | 10-2019-0126773 A | 11/2019 |
| KR | 10-2020-0080047 A | 7/2020 |

OTHER PUBLICATIONS

Written opinion of PCT/KR2019/001118 dated May 8, 2019.
International Search Report of PCT/KR2020/006008 dated Aug. 24, 2020.
Written opinion of PCT/KR2020/006008 dated Aug. 24, 2020.
Office Action of KR Application No. 10-2019-7023063 dated Feb. 6, 2020.
Office Action of KR Application No. 10-2019-7023063 dated Apr. 17, 2020.
Office Action of KR Application No. 10-2019-7023063 dated Sep. 1, 2020 .
Notice of Allowance of KR Application No. 10-2019-7023063 dated Sep. 28, 2020.
Office Action of KR Application No. 10-2020-7029786 dated Feb. 5, 2021.
Office Action of KR Application No. 10-2021-0040855 dated Jun. 14, 2021.
Office Action of KR Application No. 10-2021-0039622 dated Jun. 17, 2021.
Office Action of KR Application No. 10-2021-0040853 dated Jun. 23, 2021.
Office Action of KR Application No. 10-2021-0040854 dated Jun. 23, 2021.
Office Action of KR Application No. 10-2020-7013576 dated Jun. 30, 2021.
Non-Final Office Action of U.S. Appl. No. 17/356,528 dated Oct. 13, 2021.
Notice of Allwance of U.S. Appl. No. 17/358,116 dated Nov. 8, 2021.
Non-Final Office Action of U.S. Appl. No. 17/051,436 dated Dec. 7, 2021.
International Search Report of PCT/KR2021/011033 dated Dec. 7, 2021.
Written Opinion of PCT/KR2021/011033 dated Dec. 7, 2021.
International Search Report of PCT/KR2021/011057 dated Dec. 7, 2021.
Written Opinion of PCT/KR2021/011057 dated Dec. 7, 2021.
Office Action of KR Application No. 10-2021-0186342 dated Jan. 19, 2022.
Office Action of JP Application No. 2020-560911 dated Feb. 1, 2022.
Non-Final Office Action of U.S. Appl. No. 17/356,528 mailed Jan. 26, 2022.
Haik Kalantarian et al. "A Wearable Sensor System for Medication Adherence Prediction", Artificial Intelligence in Medicine, vol. 69, May 2016, pp. 43-52.
Extended European Search Report of EP Patent Application No. 20802993.4 dated Nov. 14, 2022.
Office Action of JP Patent Application No. 2021-565144 dated Dec. 13, 2022.
Office Action of CN Patent Application No. 202080032873.4 dated Dec. 28, 2022.

* cited by examiner

FIG. 8
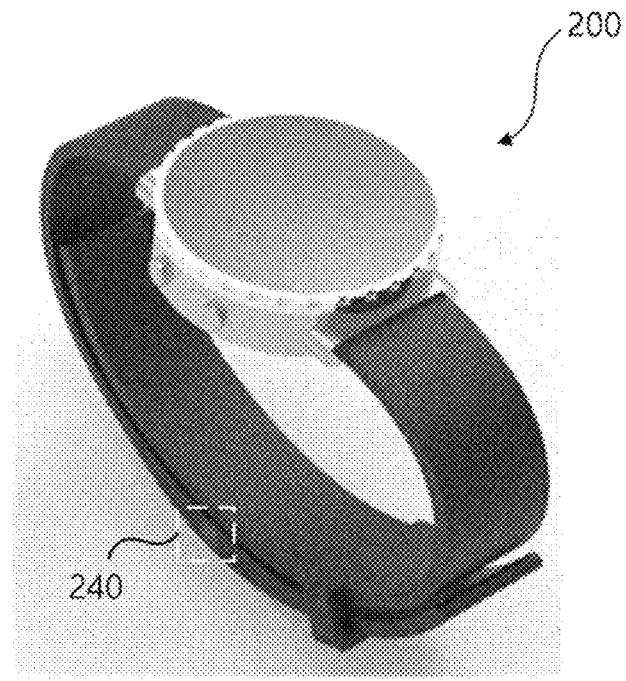
(a)
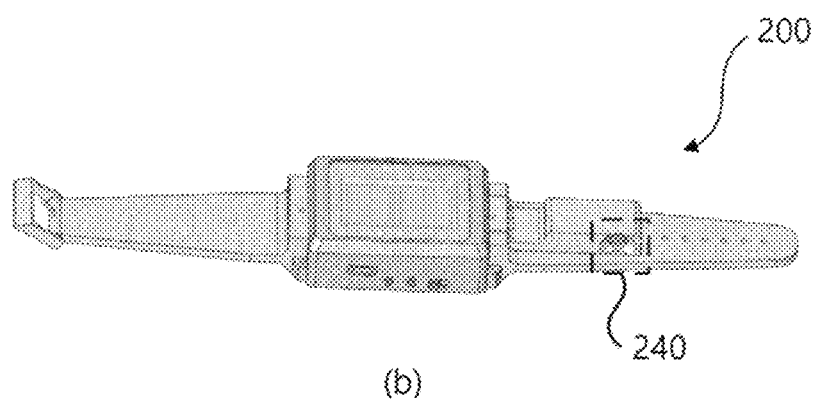
(b)

FIG. 9
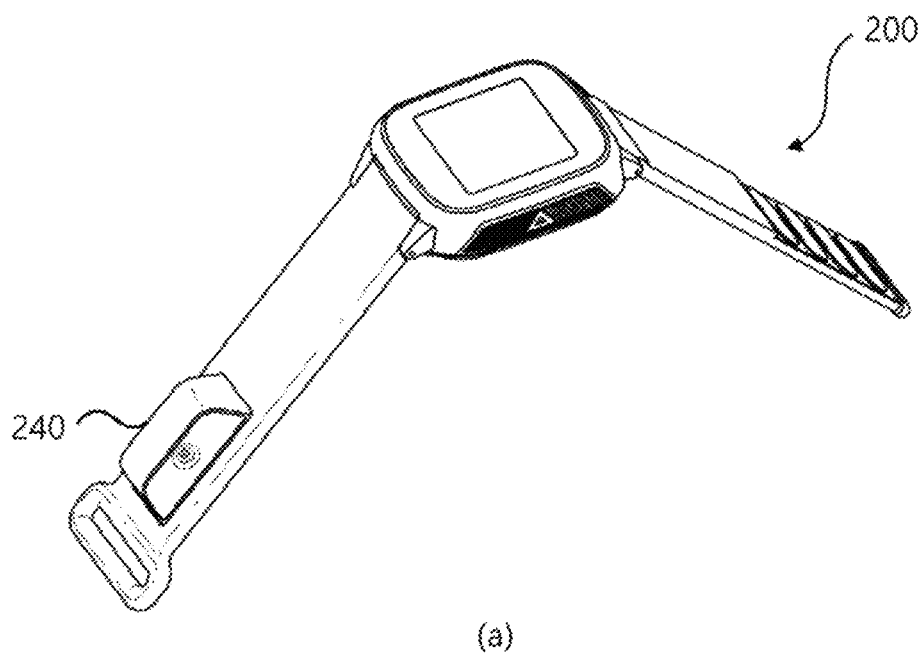
(a)
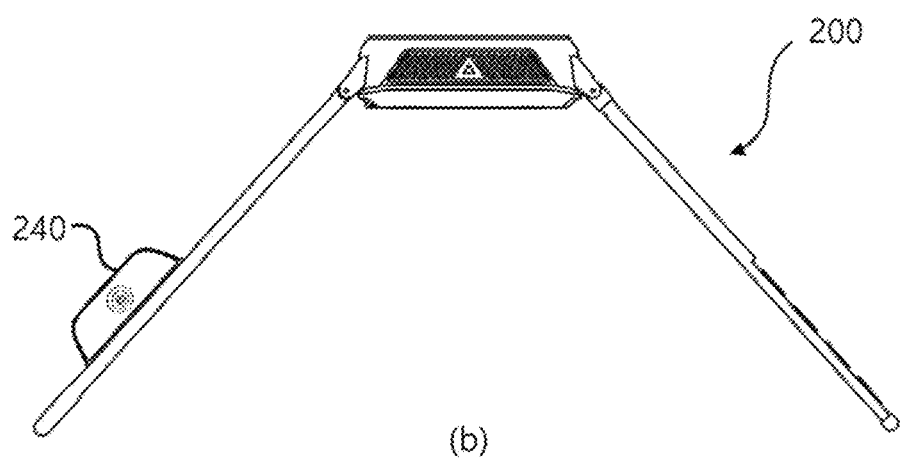
(b)

WEARABLE DEVICE FOR PERFORMING DETECTION OF EVENTS BY USING CAMERA MODULE AND WIRELESS COMMUNICATION DEVICE

CROSS-REFERENCE TO RELATED APPLICATION

This application is a Continuation Application of International Application No. PCT/KR2020/006008 filed on May 7, 2020, which claims priority to Korean Application No. 10-2019-0053276 filed on May 7, 2019, the entire contents of each of the above-identified applications are hereby incorporated by reference.

TECHNICAL FIELD

Various embodiments of the present disclosure relate to a technology for detecting an event of an object more easily by utilizing a wireless communication technology and a camera module included in a wearable device that a user is able to wear.

BACKGROUND ART

In daily life, a user engages in a number of physical activities without being aware of them. In particular, such physical activities accompany a lot of events of moving a specific object, but it is not easy for the user to remember each of the events occurring unconsciously in the user's habitual patterns.

Sometimes, a user's body activity accompanying such movement of an object is determined as an important event in several fields. For example, in a field such as healthcare, when the user takes medicine, what kind of medicine the user takes, and how much medicine the user takes may be important factors. For a specific disease, not omitting medicine administration may be a very important treatment issue.

The problem is that when such important events are omitted, the user is often not aware of this in daily life. Even if the omission is recognized late, the loss or risk due to the failure to perform the events on time cannot be retroactive.

Recently, a technology for analyzing a user's activity using a camera has been provided, but in most cases a fixed-installation camera is used and it is difficult to apply the technology to daily life.

DISCLOSURE

Technical Problem

Various embodiments of the present disclosure are intended to determine whether a predetermined event occurs by recognizing a specific object relatively simply in daily life through a wearable device and a configuration thereof, and to provide various services by recording the time at which the event occurs.

The technical problems to be solved by the present disclosure are not limited to the aforementioned technical problems and other technical problems which are not mentioned will be apparent from the following description to a person skilled in the art.

Technical Solution

According to one of various embodiments of the present disclosure, there is provided a wearable device wearable on a user's body, the wearable device including: a short-range communication module recognizing an object located within a predetermined region from the user's body; a camera module photographing a region adjacent to the wearable device and generating an image or a video related to either movement of the user's body or the object or both; a control unit determining whether to activate the camera module, based on object information collected by the short-range communication module; and a communication module transmitting, to a management server, information on the object recognized by the short-range communication module and the image or the video generated by the camera module, wherein the short-range communication module receives a signal generated from a wireless communication device attached at the object, and the control unit determines whether a specific condition is satisfied, by analyzing the signal received by the short-range communication module from the wireless communication device, and determines whether to activate the camera module accordingly.

The wearable device may be a smart watch or a smart band wearable on a wrist of the user, and the camera module may be embedded in a part of a band of the smart watch or in a part of the smart band, and at least a part of the camera module may be exposed through a side surface of either the band of the smart watch or the smart band.

The wireless communication device may generally operate in a sleep mode, and may be activated when the specific condition is satisfied and may transmit a wireless signal.

The wireless communication device may transmit wireless signals continuously in an activated state, and may cause a wireless signal transmitted when the specific condition is satisfied to include information related to satisfaction of the specific condition.

The determining, by the control unit, of whether the specific condition is satisfied, by analyzing the signal received by the short-range communication module from the wireless communication device may be performed based on at least one selected from the group of a signal strength when the short-range communication module recognizes the object, a measurement value of an illuminance sensor, and a measurement value of a motion sensor.

The control unit may perform control such that the short-range communication module operates only within any preset period of time.

The communication module may temporarily store detected wireless signal information and the image or the video generated by the camera module in a situation in which the communication module fails to access a communication network, and may transmit the temporarily stored information and image or video to the management server when accessing the communication network later.

The control unit may set feature values related to specific objects or actions from multiple reference images or videos, and may calculate a probability of capture of a specific object or a probability of occurrence of a specific action by extracting, based on the set feature values, feature values from the image or the video generated by the camera module.

According to one of various embodiments of the present disclosure, there is provided a management server acquiring information through communication with a wearable device wearable on a user's body and managing the acquired information, the management server including: a communication unit receiving information on an object automatically collected by a short-range communication module of the wearable device, and receiving an image or a video generated by the wearable device; and an action determination unit determining, based on the information on the object, whether a preset action related to the object or to the user's body is detected in the image or the video, using machine learning or artificial intelligence.

In determining whether the preset action related to the object or to the user's body is detected in the image or the video, the action determination unit of the management server may set feature values related to specific objects or actions from multiple reference images or videos, and may calculate a probability of capture of a specific object or a probability of occurrence of a specific action based on feature values extracted from the image or the video.

Advantageous Effects

According to the embodiments of the present disclosure, since whether a specific event has occurred and the time of occurrence are recorded by the wearable device, a more effective guide system for detecting user's events that may be easily missed in the field of daily life such as health care can be provided, and the system capable of performing a data analysis by learning user patterns can be realized.

Effects that may be obtained from the present disclosure are not limited to only the above described effects. In addition, other effects which are not described herein will become apparent to those skilled in the art from the following description.

DESCRIPTION OF DRAWINGS

FIG. 8 is a diagram illustrating a structure of a wearable device according to an embodiment of the present disclosure.

FIGS. 9 to 11 are diagrams illustrating a case in which a wearable device according to an embodiment of the present disclosure is provided in the form of a smart watch.

MODE FOR INVENTION

Figure 1:
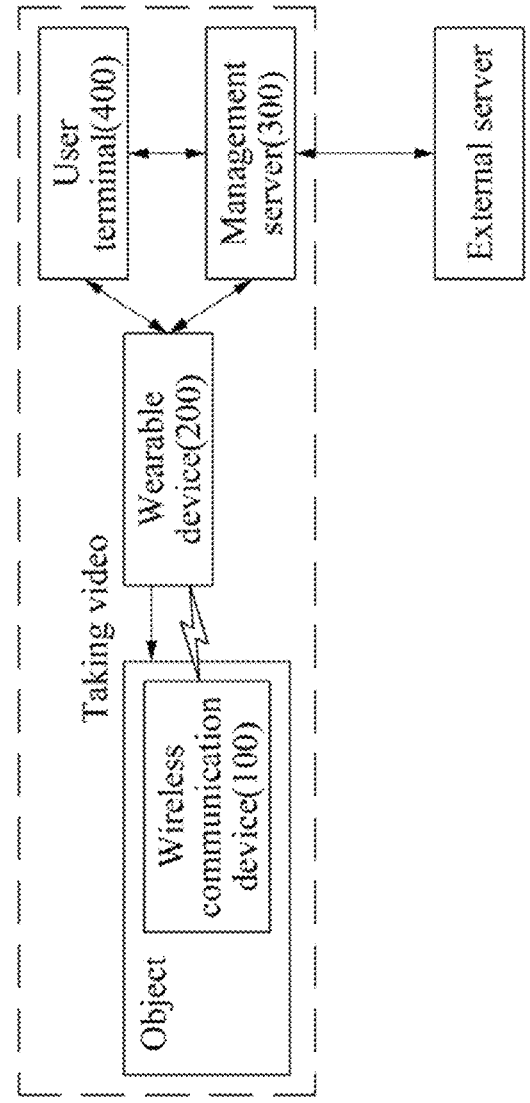
FIG. 1 is a schematic diagram illustrating an event detection system according to an embodiment of the present disclosure.

The terms used herein are provided to describe the embodiments but not to limit the present disclosure. In the specification, the singular forms include plural forms unless particularly mentioned. The terms "comprises" and/or "comprising" used herein specify the presence of stated elements, but do not preclude the presence or addition of one or more other elements. Throughout the drawings, the same reference numerals refer to the same elements. The term "and/or" includes all combinations of one or more of the associated listed elements. It will be further understood that the terms first, second, and the like may be used to describe various elements, but these elements are not limited by these terms. These terms are only used to distinguish one element from another element. For instance, a first element discussed below could be termed a second element without departing from the technical scope of the present disclosure.

The word "event" referred to in this document may mean an action in which an object is positioned in a specific region or is moved, the object being in connection with a user's body. For example, events may include a behavior of taking medicine or food, but no limitation thereto is imposed.

FIG. 1 is a schematic diagram illustrating an event detection system 10 according to an embodiment of the present disclosure. The event detection system 10 makes a wearable device 200 perform a function of recognizing a signal transmitted from a wireless communication device 100 attached at an object, detects whether a predetermined valid event has occurred as the object is photographed, and records time information.

According to an embodiment, the event detection system 10 may include the wireless communication device 100, the wearable device 200, a management server 300, and a user terminal 400.

The wireless communication device 100 is attached at an object or positioned in a region adjacent to an object and is recognized by the wearable device 200, thereby performing a function of enabling the wearable device 200 to recognize the object. The wireless communication device 100 may include a cellular communication module, a short-range wireless communication module, and a global navigation satellite system (GNSS) communication module, for example. Examples of the short-range wireless communication module include a beacon, Bluetooth, Wi-Fi direct, ZigBee, an RF module, and NFC, but are not limited thereto.

According to an embodiment, the wireless communication device 100 may transmit a wireless signal (for example, a Bluetooth signal), and may transmit a signal only in a specific situation, so that power consumption of a battery of the wireless communication device is reduced.

According to various embodiments, the wireless communication device 100 may operate in a sleep mode, and may be activated when a specific condition is satisfied and may transmit a wireless signal. In this case, the specific condition may be a condition in which at least one of a measurement value of an illuminance sensor or a measurement value of a motion sensor reaches specific values, or a condition in which a rate of change of each measurement value or calculation value reaches a specific value. Accordingly, the battery power may be prevented from being unnecessarily consumed.

According to another embodiment, the wireless communication device 100 may transmit a wireless signal in real time, and when an event satisfying a specific condition occurs, the wireless communication device 100 may transmit a wireless signal including information indicating that the specific condition is satisfied. Also in this case, the specific condition may be related to at least one of a measurement value of an illuminance sensor or a measurement value of a motion sensor. As described above, in the case in which the wireless communication device 100 does not operate in a sleep mode, but operates all the time and transmits a wireless signal in real time, the time taken for the wireless communication device 100 to be activated from a sleep mode when a specific condition occurs is not required. Since the wireless communication device 100 always communicates with the wearable device 200 in a wireless manner, the time taken for a camera module of the wearable device 200 to respond when a specific condition occurs may be reduced.

The wireless communication device 100 may include at least one of various sensor modules, such as various GPS sensors, gesture sensors, gyro sensors, 9-axis sensors, illuminance sensors, and motion sensors. For example, the wireless communication device 100 may include at least one selected from the group of a beacon, a short-range wireless communication device, and a long-range wireless communication device. One of the operation methods of the wireless communication device 100 is that the movement of an object at which the wireless communication device 100 is attached is detected utilizing a 9-axis sensor and a wireless signal is generated accordingly. The 9-axis sensor according to an embodiment may be composed of an acceleration sensor for three axes, a gyro sensor for three axes, and an earth magnetic sensor for three axes, and the movement of the object at which the sensor is attached may be measured accordingly. The wireless communication device 100 is attached at an object, detects the movement of the object through the sensor described above, and generates a wireless communication device signal only when a specific condition is satisfied. As described above, when a specific condition occurs, the wireless communication device 100 is activated from a sleep state and transmits a wireless signal. Alternatively, the wireless communication device 100 that has been transmitting a wireless signal in real time transmits a wireless signal additionally including information indicating that the specific condition has occurred.

In an embodiment of the present disclosure, when a wireless signal is recognized by a short-range communication module of the wearable device 200, the wearable device 200 may determine whether to activate the camera module, based on wireless signal information collected through the wireless communication device 100. Specifically, when the wearable device 200 receives the wireless signal information indicating that the specific condition has occurred, the camera module may be activated.

The wearable device 200 may be an electronic device that is wearable on at least a part (for example, a wrist) of a user's body, and may be realized as, for example, a smart watch, smart glasses, or a smart helmet, but is not limited thereto. In an embodiment of the present disclosure, the wearable device 200 performs a role of recognizing an object through a short-range communication module, a camera module, or a sensor module, of photographing a region adjacent to the wearable device 200, and of transmitting a result of photographing to the management server 300. A detailed configuration of the wearable device 200 will be described later with reference to FIG. 2.

According to an embodiment of the present disclosure, the wearable device 200 may be provided as a smart watch that is wearable on a user's wrist. In this case, the camera module or the sensor module included in the wearable device 200 may be located on a band connected to a casing of the smart watch. For example, in a case in which the casing of the smart watch is to be positioned on a wrist part connected to the back of a hand, the camera module or the sensor module may be provided on the band that is to be positioned on a wrist part connected to the front of the hand. Through such a configuration, the wearable device 200 may detect or photograph an action or event performed on the user's palm side through the camera module or the sensor module, and may detect or photograph an object positioned near the user's palm or held by the user's hand.

The camera module included in the wearable device 200 may be formed in the band of the smart watch in an integrated manner. A detailed configuration thereof will be described later.

The management server 300 performs a function of being connected to the wearable device 200 of the user over a network, of receiving information collected by the wearable device 200, and of determining whether a specific event has occurred by analyzing the received information. In addition, the management server 300 may provide the collected or processed information to the user terminal 400 over the network. The management server 300 may include information on hardware, such as a control unit having at least one processor, a communication module, and a storage unit (e.g., memory), or information on software for algorithm operation.

The user terminal 400 is connected to the wearable device 200 and performs a role, such as creating an initial set value of the wearable device 200 and changing the set value. Such operation may be achieved according to the manipulation performed on the user terminal 400 by the user. The user may access the management server 300 through the user terminal 400, may identify information transmitted from the wearable device 200 managed by the user to the management server 300, and may also identify information processed by the management server 300 using the information transmitted thereto.

According to an embodiment of the present disclosure, examples of the user terminal 400 include all types of handheld wireless communication devices, such as a mobile phone, a smartphone, a personal digital assistant (PDA), a portable multimedia player (PMP), and a tablet PC, that is capable of being connected to a web server over a network. The user terminal 400 may be one of digital devices, such as a personal computer (e.g., a desktop computer, and a laptop computer), a workstation, a PDA, and a web pad, having memory means and equipped with a microprocessor for calculation ability.

An external server may be a device or program that transmits and receives information (e.g., identification information for a wireless signal, and image information of an object corresponding to a wireless signal) required for the management server 300 over the network.

Figure 2:
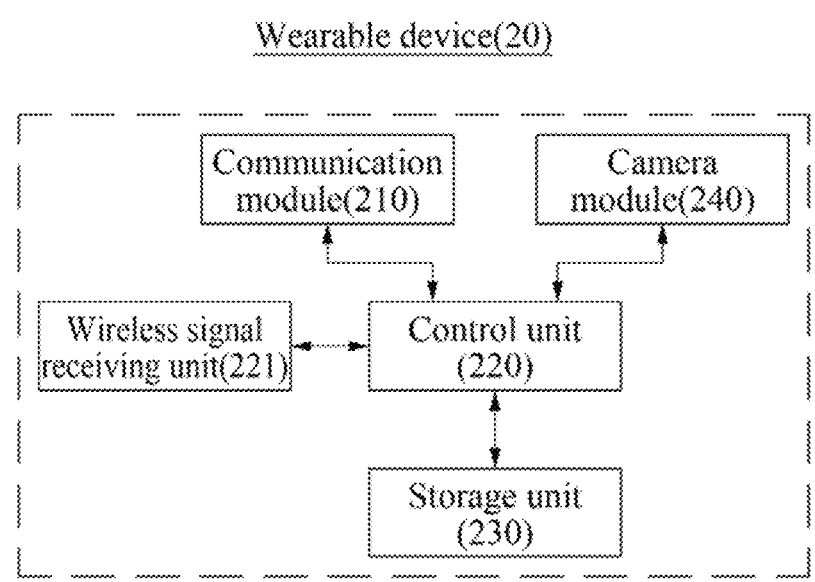
FIG. 2 is a block diagram illustrating a wearable device according to an embodiment of the present disclosure.

FIG. 2 is a block diagram illustrating a wearable device 200 according to an embodiment of the present disclosure. The wearable device 200 may include a communication module 210, a control unit 220, a wireless signal receiving unit 221, an object recognition unit 223, an event detection unit 225, a storage unit 230, and a camera module 240.

The communication module 210 of the wearable device 200 performs a function of receiving a wireless signal generated from the wireless communication device 100, and of transmitting and receiving information required for the operation of the wearable device 200 by communicating with the management server 300, the user terminal 400, or the external server. The communication module 210 may be realized as a short-range communication module, such as Bluetooth, ZigBee, an infrared communication module, NFC, an RF module, a QR code module, or a Wi-Fi module, or may be realized as a long-range form, such as a network communication module, and a base-station communication module.

The control unit 220 may perform a data processing function of controlling overall operation, such as control of power supply to the wearable device 200, and a signal flow between internal constituents of the wearable device 200, and of processing data. The control unit 220 may include at least one processor or MCU.

The control unit 220 may determine whether to activate the camera module 240 and may control the operation of the camera module 240 accordingly. In addition, the control unit 220 may control the operation of the short-range communication module. According to an embodiment, the control unit 220 may perform control such that the short-range communication module operates only within any preset period of time.

According to an embodiment, the control unit 220 may be realized in the form of including all the functions of the management server 300 described later. In this case, the control unit 220 of the wearable device 200 performs the role of the management server 300 by itself and is thus able to operate without the management server 300.

The wireless signal receiving unit 221 may collect signals generated from the wireless communication device 100 attached at an object. The wireless signal collection method of the wireless signal receiving unit 221 may be similar to the communication method of the communication module 210 described above. In addition, at least some constituents of the wireless signal receiving unit 221 may be included in the communication module 210.

The storage unit 230 may store therein data received or generated from the control unit 220, the wireless communication device 100, the wearable device 200, the management server 300, the user terminal 400, or other elements of the event detection system 10. Examples of the storage unit 230 may include a memory, a cache, and a buffer, and the storage unit 230 may composed of software, firmware, hardware, or a combination of at least two thereof.

The camera module 240 photographs a region adjacent to the wearable device 200 and generates an image or video related to either the movement of a user's body or an object or both. The camera module 240 may include a 2D or 3D camera device, and may include a driving means (e.g., an actuator) for rotating or moving a lens of the camera.

According to an embodiment, the camera module 240 is activated when the wearable device 200 recognizes an object through the communication module 210, or is activated when a specific behavior of a user is detected through the sensor module of the wearable device 200 or information indicating that a specific condition is satisfied is acquired from a signal received from the wireless communication device 100. However, no limitation thereto is imposed, and the camera module 240 may be activated by other specific conditions (e.g., a user selects an activation function arbitrarily). In the process in which the wearable device 200 detects a specific behavior of a user, the wearable device 200 may detect the signal strength when the short-range communication module recognizes an object. Taking as an example the case in which the wearable device 200 recognizes an object using a signal generated from the wireless communication device 100, the signal strengths may vary according to the distance between the wearable device 200 and the wireless communication device 100, so that the distance between the wearable device 200 and the object may be calculated based on the signal strength. The signal strength may be calculated through RSSI.

To this end, although not shown in FIG. 2, the wearable device 200 may further include a sensor module capable of recognizing a specific behavior of a user as described above. The sensor module may include at least one sensor capable of measuring a physical quantity or detecting an operating state of the wearable device 200, and of converting the measured or detected information into an electrical signal. The sensor module may include, for example, at least one selected from the group of a GPS sensor, a gesture sensor, a gyro sensor, a barometric pressure sensor, a magnetic sensor, an acceleration sensor, a proximity sensor, a biometric sensor (e.g., an iris sensor, and a fingerprint sensor), an infrared sensor, an ultraviolet-ray sensor, a 9-axis sensor, and an illuminance sensor.

In FIG. 2 described above, subjects performing respective roles in the wearable device 200 are expressed using the word "unit" or "module", but the respective parts may be constituents resulting from functional classification of a sub-program module or the control unit 220 operating in the wearable device 200. These program modules are a concept encompassing routines, sub-routines, programs, objects, components, and data structures that perform respective operations or execute specific abstract data types, but no limitation thereto is imposed.

Figure 3:
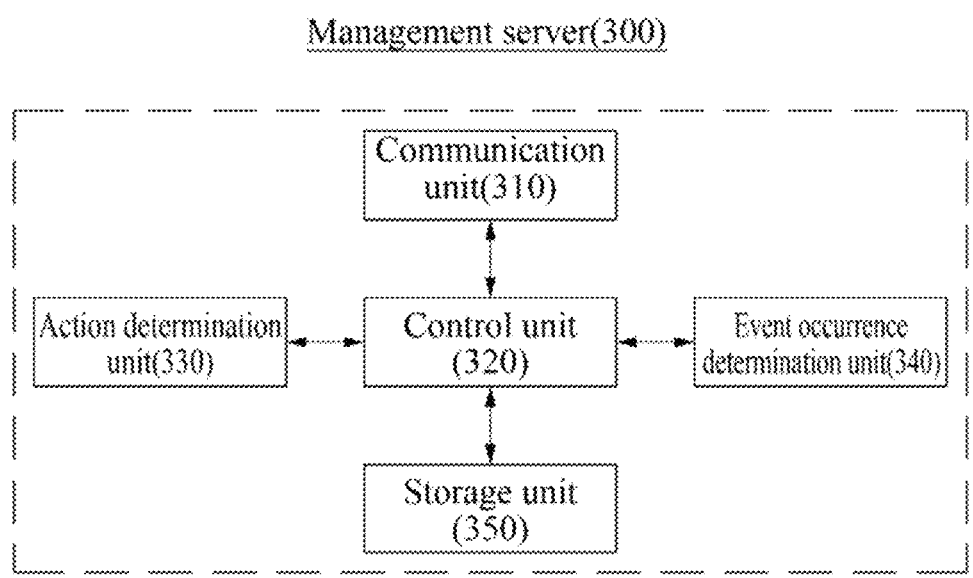
FIG. 3 is a block diagram illustrating a management server according to an embodiment of the present disclosure.

FIG. 3 is a block diagram illustrating a management server 300 according to an embodiment of the present disclosure. The management server 300 may include a communication unit 310, a control unit 320, an action determination unit 330, an event occurrence determination unit 340, and a storage unit 350.

The communication unit 310 of the management server 300 performs a function of transmitting and receiving information required for the operation of the management server 300 by communicating with the wearable device 200, the user terminal 400, or the external server.

The communication unit 310 may receive, from the wearable device 200, information on an object collected by the wearable device 200 through the short-range communication module, and an image or video generated through the camera module 240.

In addition, the communication unit 310 may transmit, to the user terminal 400, information on whether an event has occurred, which is determined by the event occurrence determination unit 340.

According to an embodiment of the present disclosure, the communication unit 310 may control the operation of the wearable device 200 through real-time communication between the management server 300 and the wearable device 200.

The control unit 320 may perform a data processing function of controlling overall operation, such as control of power supply to the management server 300, and a signal flow between internal constituents of the wearable device 200, and of processing data. The control unit 320 may include at least one processor or MCU.

The action determination unit 330 may determine whether a preset action is detected, based on the object information and the image or video received by the communication unit 310. Specifically, the action determination unit 330 may determine, based on the object information, whether a preset action related to the object or user's body is detected, and such determination may be performed based on machine learning or artificial intelligence.

The action determination unit 330 may extract feature values related to a preset object or actions in the image or video received from the wearable device 200, and the extraction of feature values may be performed with respect to multiple objects or actions.

The action determination unit 330 may set feature values for a specific object or action, from multiple images or videos provided in advance, and based on this, may extract feature values in the image or video received from the wearable device 200. Afterward, the action determination unit 330 may calculate the probability of capture of the specific object or the probability of occurrence of the specific action based on the extracted feature values.

According to an embodiment of the present disclosure, preset actions related to a specific object or user's body may be differently set for respective objects. For example, when a first object is recognized, a first action and a second action may be preset actions related to a user's body. When a second object is recognized, a third action and a fourth action may be preset actions related to a user's body.

According to an embodiment of the present disclosure, in the present disclosure, an object recognized through a wireless signal may be an object related to a medicine, and a preset action may be a situation related to a medicine or a medicine-taking behavior. For example, an object recognized through a signal generated from the wireless communication device 100 may be a container containing a medicine. In this case, preset actions may include exposure of the medicine, a situation in which the container is opened, a situation in which the medicine is held in the user's hand, and a situation in which the medicine approaches the user's mouth.

The event occurrence determination unit 340 may perform a function of determining whether a specific event has occurred. In determining, based on the probability calculated using feature values, whether a specific event has occurred, the event occurrence determination unit 340 may determine whether a specific event has occurred, by synthesizing weights set for the respective preset actions detected by the action determination unit 330.

For example, when the action determination unit 330 determines that a first action, a second action, and a third action that are preset actions for a recognized specific object are detected, the event occurrence determination unit 340 determines whether a specific event has occurred, through final calculation by applying weight values respectively preset to the first action, the second action, and the third action.

The storage unit 350 may store therein data received or generated from the control unit 320, the wearable device 200, the user terminal 400, or other elements of the event detection system 10. Examples of the storage unit 350 may include a memory, a cache, and a buffer, and the storage unit 230 may composed of software, firmware, hardware, or a combination of at least two thereof.

The storage unit 350 may store therein machine learning or artificial intelligence-related data that the action determination unit 330 uses, and may also store therein data related to whether a specific event has occurred, wherein the data is generated by the event occurrence determination unit 340. In addition, the storage unit 350 stores therein information on the wearable device 200 and the user terminal 400, and may store therein information on which user terminal 400 a specific wearable device 200 is associated with.

According to an embodiment, the storage unit 350 may not be the storage unit embedded in the management server 300, but may be substituted with an online server (for example, a cloud server). In this case, the management server 300 may store various types of information on the online server for use.

Hereinafter with reference to FIGS. 4 and 5, the operation determining whether an event has occurred by receiving information from the management server 300, when the wearable device 200, through same configurations in FIGS. 1 and 2, detects the object and generates an image or a video by the camera module. At least some of the steps shown in FIGS. 4 and 5 may be omitted or may be changed in order.

Figure 4:
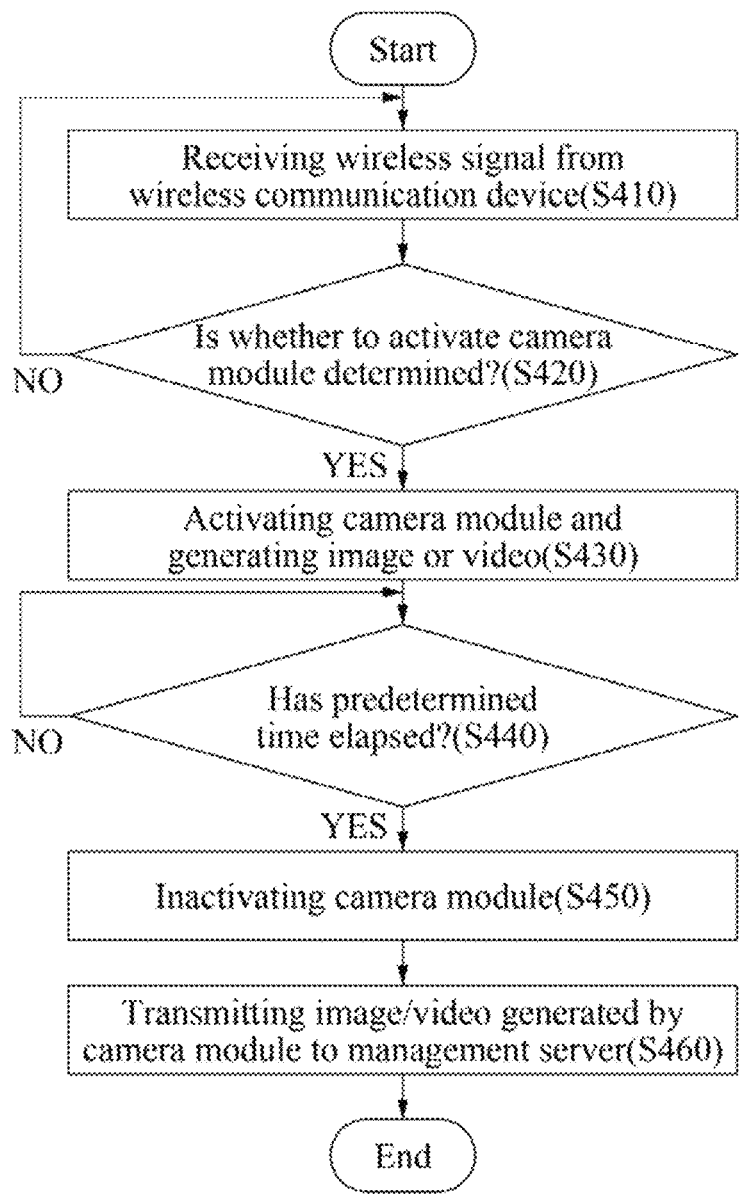
FIG. 4 is a flowchart illustrating an operation of detecting an object and generating an image or video by a wearable device according to an embodiment of the present disclosure.

FIG. 4 is a flowchart illustrating an operation of detecting an object and generating an image or video by a wearable device 200 according to an embodiment of the present disclosure.

When a user approaches an object, the wearable device 200 receives a wireless signal generated from the wireless communication device 100 at step S410. The wireless signal that the wearable device 200 receives may include information on a specific condition (for example, a measurement value of the illuminance sensor, and a measurement value of the motion sensor).

Afterward, the control unit 220 of the wearable device 200 may determine whether to activate the camera module 240, based on the information included in the received wireless signal at step S420. For example, the control unit 220 may determine whether to activate the camera module 240, based on the time at which the wireless signal generated from the wireless communication device 100 is collected, a measurement value of the illuminance sensor, a measurement value of the motion sensor, and an RSSI value.

When the control unit 220 determines not to activate the camera module 240, the wearable device 200 returns to a state in which recognition of a wireless signal or detection of a specific behavior is performed.

Conversely, when the control unit 220 determines to activate the camera module 240, the control unit 220 activates the camera module 240 so that an image or video is generated through photographing at step S430.

Afterward, the control unit 220 may determine whether a predetermined time has elapsed at step S440. When the predetermined time has elapsed, the control unit 220 performs control such that the camera module 240 enters an inactive state at step S450. According to an embodiment of the present disclosure, the predetermined time may be measured starting from the time at which the camera module 240 is activated. While the camera module 240 is activated, when the wearable device 200 recognizes a wireless signal or detects a specific behavior of a user additionally, the time being measured is reset and the time for the camera module 240 being activated is extended.

After the camera module 240 is inactivated, the wearable device 200 may transmit the image or video generated by the camera module 240 to the management server 300 at step S460. In addition, in the process of transmitting the image or video generated by the camera module 240 to the management server 300, the wearable device 200 may also transmit information (for example, a measurement value of the illuminance sensor, a measurement value of the motion sensor, and an RSSI value) on the conditions under which the image or video is generated to the management server 300.

According to an embodiment of the present disclosure, in a situation in which the wearable device 200 fails to access the communication network, collected information on the object, detected wireless signal information (specific-condition satisfaction information and sensor information), and the image or video generated by the camera module 240 may be temporarily stored in the storage unit 230 of the wearable device 200. When the wearable device 200 is connected to the wireless communication network later, the various types of data listed above are transmitted to the management server 300.

Figure 5:
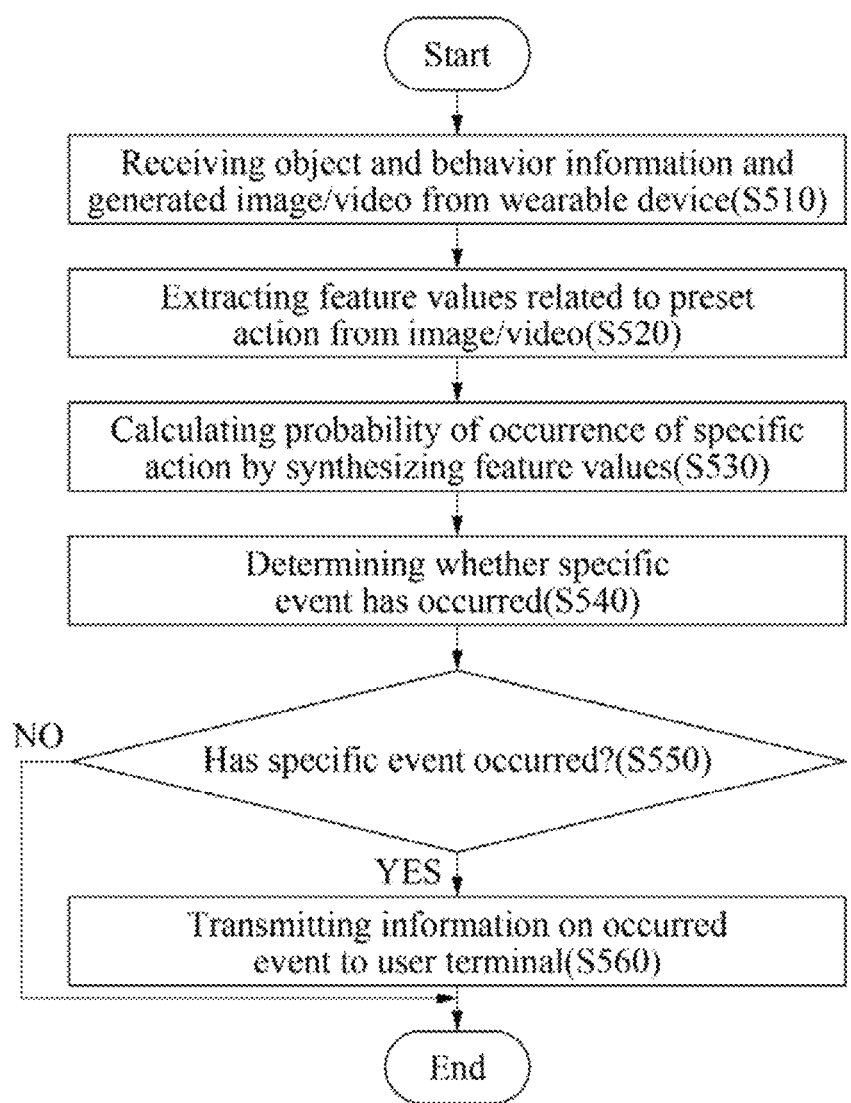
FIG. 5 is a flowchart illustrating an operation in which a management server according to an embodiment of the present disclosure manages information received from a wearable device and finally determines whether a specific event has occurred.

FIG. 5 is a flowchart illustrating an operation in which a management server 300 according to an embodiment of the present disclosure manages information received from a wearable device 200 and finally determines whether a specific event has occurred, consequently. Like the contents of FIG. 4, at least some of the steps shown in FIG. 5 may be omitted or may be changed in order.

When the wearable device 200 transmits the object information, the specific behavior of the user, and the image or video generated in connection therewith at step S460 of FIG. 4, the management server 300 receives the object information, the specific behavior of the user, and the image or video at step S510.

Afterward, the management server 300 may extract feature values related to a preset object or actions from the received image or video at step S520. The extraction of feature values may be performed with respect to multiple objects or actions, and the management server 300 may perform extraction of feature values for the objects or actions based on an artificial intelligence technology. According to an embodiment, as a data analysis is conducted based on a deep learning technology by the management server 300, extraction of feature values within data may be automatically performed, and the ability related to extraction of feature values keeps improving.

The management server 300 may calculate the probability of occurrence of a specific action or the probability of capture of a specific object at step S530 by synthesizing the feature values derived as a result of step S520. When it is determined based on this that specific actions have occurred or a specific object has been captured, the management server 300 thus determines whether a specific event has occurred at step S540. When the management server 300 determines that a specific event has occurred, the management server 300 transmits information on the occurred event to the user terminal 400 at step S560.

Hereinafter, performed through the configuration as shown in FIGS. 1 and 2, the operation in which the management server 300 detects an event of an object will be described in detail with reference to FIGS. 6 and 7. In the embodiment described with reference to FIGS. 6 and 7, it is described that detection and determination of an action and an event are performed by the management server 300, but in another embodiment of the present disclosure, detection and determination of an action and an event may be performed by the wearable device 200 rather than the management server 300.

Figure 6:
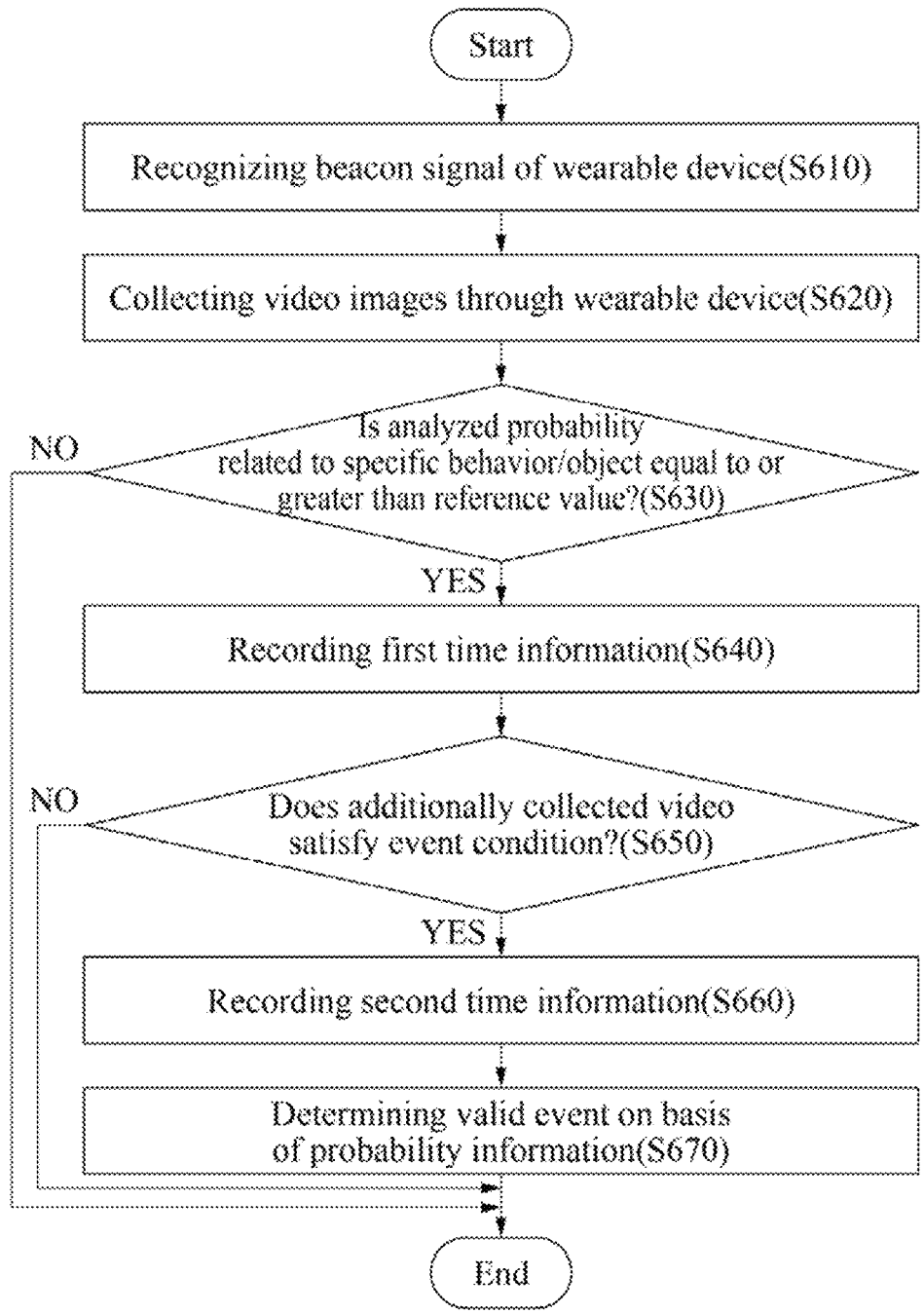
FIG. 6 is a flowchart illustrating an operation of detecting an event of an object by a wearable device according to another embodiment of the present disclosure.
Figure 7:
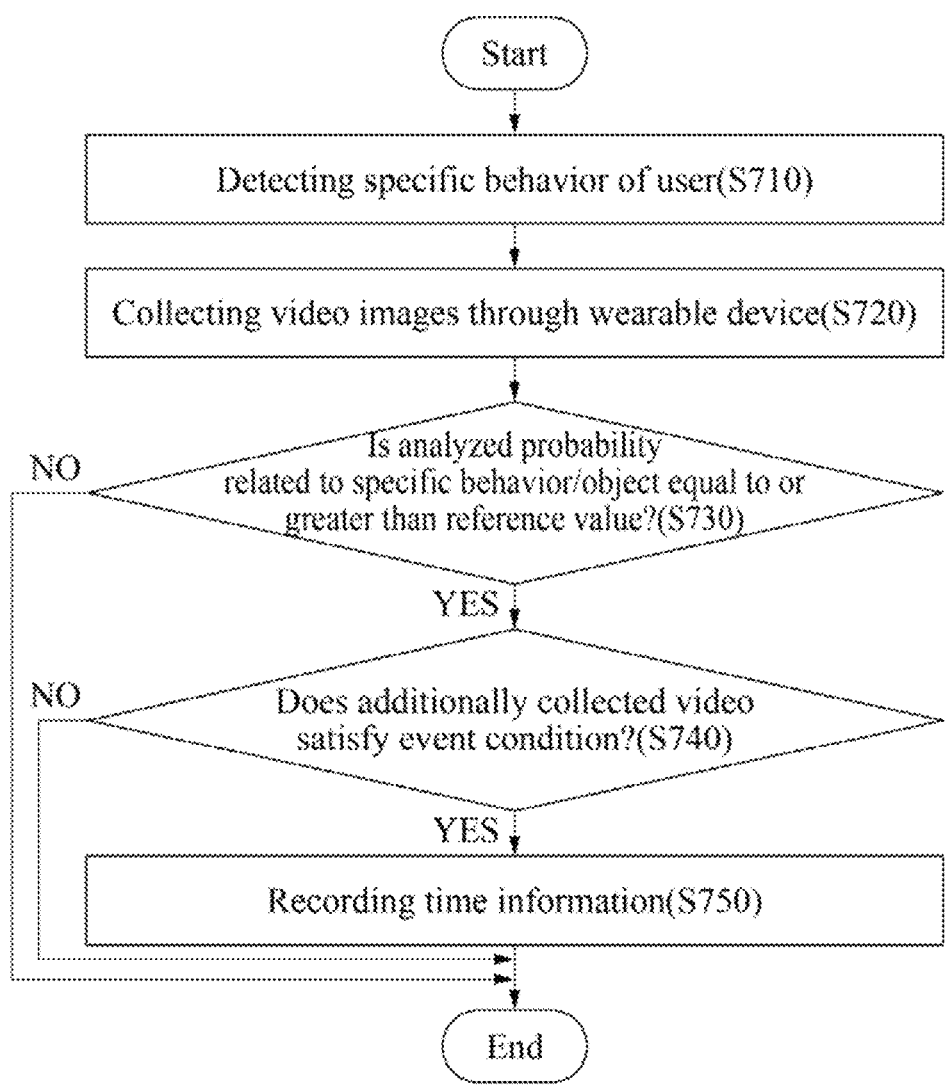
FIG. 7 is a flowchart illustrating an operation of detecting an event of an object by a wearable device according to another embodiment of the present disclosure.

At least some of the steps shown in FIGS. 6 and 7 may be omitted or may be changed in order.

FIG. 6 is a flowchart illustrating an operation of detecting an event of an object by a management server 300 according to an embodiment of the present disclosure.

When a user approaches an object, the wearable device 200 recognizes a wireless signal at step S610 and video images of the object are collected through the camera module 240 of the wearable device 200. The step S610 may be performed by the wearable device 200 rather than the management server 300.

For example, when the wireless communication device 100 is attached at a specific medicine wrapper and a user holds the medicine wrapper with the wearable device 200 worn on the user's wrist, a signal is generated from the wireless communication device 100 attached at the medicine wrapper according to the movement of the medicine wrapper and the communication module of the wearable device 200 scans the wireless signal, so that the object "medicine" is recognized. Accordingly, the camera module 240 of the wearable device 200 may be activated and collect video images of the surrounds. The video images collected by the camera module 240 of the wearable device 200 may include a video of exposure of a medicine, opening of the medicine container, a situation in which the medicine is held in the user's hand, and a situation in which the medicine approaches the user's mouth. The camera module 240 of the wearable device 200 may photograph multiple video images, and photographing of the video image may be performed during a predetermined time at any time intervals.

When the multiple video images are generated by the camera module 240 of the wearable device 200 as described above, the management server 300 receives and collects the video images from the wearable device 200 at step S620.

Next, the management server 300 may identify the content (e.g., an image of the medicine) corresponding to the scanned object (e.g., the medicine) through the local storage unit 350 or the online cloud server, may compare the identified content and the images collected through photographing or filming, by using an artificial intelligence technology, and may determine whether the probability that the collected video images are related to a specific behavior, such as a medicine-taking behavior, or to a container containing a specific medicine is equal to or greater than a reference value at step S630.

According to an embodiment, the determination operation at step S630 may be performed through a first determination algorithm using an image similarity determination technology. For example, the control unit 320 may divide a region, such as color and texture, of the video collected through photographing and of the video identified through scanning, and may determine image similarity through matching operation based on location information and a color table or object similarity. Examples of the first determination algorithm may include various image similarity determination technologies and are not limited to a specific technology. In addition, an artificial intelligence technology may be applied to the first determination algorithm. That is, the management server 300 may perform image similarity determination by utilizing an artificial intelligence technology, and accordingly, the first determination algorithm may be derived and developed through machine learning such deep learning.

In addition, the method of determining matching may determine whether a similarity numerical value derived through the similarity operation is equal to or greater than a predetermined threshold value. The similarity numerical value may be derived in the image similarity determination process. When the similarity numerical value is equal to or greater than the predetermined threshold value, the control unit 320 determines that the acquired image and the image identified according to the reception of the wireless signal match, and time information at this time is recorded as first time information at step S640. Such image matching may be performed through an analysis of multiple images resulting from photographing. The control unit 320 may calculate the probability that a specific event has occurred through multiple video images. The first time information at step S640 may be information on the time at which whether a specific object is an object for monitoring occurrence of an event is determined.

Regarding image matching based on determination of similarity performed by the management server 300 of the present disclosure, a comprehensive analysis and matching through an artificial intelligence technology may be performed rather than matching of a specific event or an image in a one-to-one manner. For example, in a process of determining an object that is a medicine bottle, the management server 300 captures common points of multiple reference images for the object that is the medicine bottle, sets feature values, and calculates the similarity that the images collected through the wearable device 200 have in a relationship with the feature values, thereby performing similarity determination.

According to an embodiment, the first time information may be, for example, used as meta data for a data analysis of occurrence of an event, and may be used as information for analyzing user patterns. As a non-limiting example, when the difference in time between the first time information and second time information, which will be described later, is equal to or greater than a predetermined value, the second time information is determined as error data depending on a case. This is because, for example, when a user touched a medicine, but when it is recognized that the medicine was brought to the mouth after several hours have passed, determining that the recognized medicine was taken may be an error. However, the recording of the first time information may be omitted.

In addition, the control unit 320 may calculate the similarity numerical value as probability information of the first determination algorithm. The probability information of the first determination algorithm may be used to secure the reliability of accumulated data by probabilistically determining a valid event, which will be described later.

In the meantime, when matching at step S630 is not satisfied, the operation of FIG. 3 ends, or waits in an idle state to recognize a signal generated from a wireless communication device attached at anew object.

Next, the control unit 320 may additionally collect a video of the object and may determine whether the collected video satisfies an event condition at step S650. According to an embodiment, the event condition may be a condition for identifying whether a preset action related to the user's body with respect to the object is detected. For example, the control unit 320 may identify whether the medicine taken out by the user enters the mouth, which is a part of the user's body. The identification operation may be derived by applying a second determination algorithm based on machine learning or algorithm. For example, the control unit 320 may use an image analysis technology using a known artificial intelligence technology, and may compare the feature values extracted from the collected images with feature values extracted from other images, thereby calculating the probability that the behavior "taking medicine" has been performed. The latter images may be images that are references for an image analysis, and may be composed of administration images or non-administration images.

Both the first determination algorithm and the second determination algorithm utilizing artificial intelligence may have the accuracy and rate of determination improved as images are accumulated and a result of determination is updated accordingly.

When the collected video satisfies the event condition, the control unit 320 records the time at which the video is collected as the second time information at step S660. For example, the control unit 320 may record, as the second time information, the time at which the medicine enters the user's mouth or the time within a predetermined error range thereof The second time information may be immediately determined using the time at which an event of the object occurs, or may be determined after determining whether a specific condition is satisfied and recognizing a valid event. The valid event may mean an event that is arbitrarily selected by the user among events occurring at the object to record the time information.

In addition, the control unit 320 may derive, as a numerical value, whether a preset action related to the user's body is detected through the second determination algorithm, and may calculate the resulting value as probability information of the second determination algorithm. Like the probability information of the first determination algorithm described above, the probability information of the second determination algorithm may also be used in probabilistically determining whether an event occurring at the object is a valid event.

Next, the control unit 320 may finally determine a valid event based on the probability information at step S670. Specifically, the control unit 320 may determine that the valid event has occurred when the sum of the probability information of the first determination algorithm and the probability information of the second determination algorithm is equal to or greater than a predetermined value, and may determine the second time information using the time at which the valid event occurs. For example, the control unit 320 converts whether the object is a monitoring target object (e.g., a medicine) into a numerical value, converts whether a predetermined event (e.g., a behavior of approaching the mouth) occurs at the object into a numerical value, and determines the event as a valid event when the sum of the numerical values is equal to or greater than a predetermined value.

In this case, the control unit 320 may assign a higher weighting to the probability information of the second determination algorithm than to determination information of the first determination algorithm. This is because in the event occurrence condition, what movement has occurred at an object may actually be a more important factor than whether there is an object, and a process of recognizing the object may be involved in a process of identifying whether an event condition is satisfied. However, the step S670 may be omitted, so the second time information may be simply determined using the time at which a valid event occurs.

FIG. 7 is a flowchart illustrating an operation of detecting an event of an object by a management server 300 according to another embodiment of the present disclosure. Among the contents of FIG. 7, the content the same as that of FIG. 6 may be omitted or simplified. Like the contents of FIG. 6, at least some of the steps shown in FIG. 7 may be omitted or may be changed in order.

In FIG. 7, the camera module 240 of the wearable device 200 is activated on condition that a specific behavior of a user is recognized instead of the step S610 of FIG. 6 described above according to some embodiments. To this end, the control unit 320 of the management server 300 may detect a specific behavior of the user at step S710 through the sensor module, the camera module 240, or the communication module 210 of the wearable device 200. The specific behavior of the user includes a unique movement of the user's body. For example, when the user eats food, an action in which the food is brought to the mouth with the hand on which the wearable device 200 is worn is detected. In this case, the control unit 320 of the management server 300 may be set to recognize the specific behavior when a sensor value corresponding to a value predetermined to recognize the specific behavior of the user is collected through the sensor module, or when the collected sensor value is analyzed and a result of the analysis corresponds to a specific pattern, but no limitation thereto is imposed.

When the specific behavior of the user is detected as described above, the control unit 320 of the management server 300 activates the camera module 240 of the wearable device 200 to collect video images, and receives the video images from the wearable device 200 at step S720. Afterward, the same as or similarly to the contents of FIG. 6, the management server 300 may perform a probability value determination operation related to a specific behavior or an object at step S730, may perform an event condition satisfaction operation at step S740, and may record time information at step S750. Like FIG. 6, a function of dividing time information into the first time information and the second time information and a function of determining a valid event based on the probability information may be omitted in FIG. 7. Alternatively, the contents described with reference to FIG. 6 may be performed in the same manner.

The steps described as being performed by the management server 300 with reference to FIGS. 6 and 7 may be performed by the wearable device 200. In this case, the wearable device 200 may perform the role of the management server 300 by itself, including all the above-described functions of the management server 300.

Through the embodiments described above with reference to FIGS. 1 to 7, since whether a specific event has occurred and the time of occurrence are recorded by the wearable device 200, a more effective guide system for detecting user's events that may be easily missed in a field such as health care can be provided, and the system capable of performing a data analysis by learning user-patterns can be realized.

FIG. 8 is a diagram illustrating a structure of a wearable device 200 according to an embodiment of the present disclosure.

Referring to (a) of FIG. 8, the wearable device 200 may be provided as a smart watch that is wearable on a user's wrist. The camera module 240 included in the wearable device 200 may be included in the band of the smart watch in an integrated manner.

In a case in which the camera module 240 is included in the band of the smart watch, a lens part, which needs to be exposed to the outside of the band, of the camera module 240 may be located on the side surface of the band. Since the lens part of the camera module 240 is exposed at the side surface of the smart watch band, a region photographed by the camera module 240 is set to be in a palm-side direction when the user is wearing the smart watch.

Referring to (b) of FIG. 8, the wearable device 200 may be provided as a smart watch that is wearable on a user's wrist. The camera module 240 included in the wearable device 200 may be included in a particular housing formed to be close to the band of the smart watch. Even in this case, the location of the camera module 240 may be determined so that a region photographed by the camera module 240 is set to be in a palm-side direction when the user is wearing the smart watch.

Figure 10:
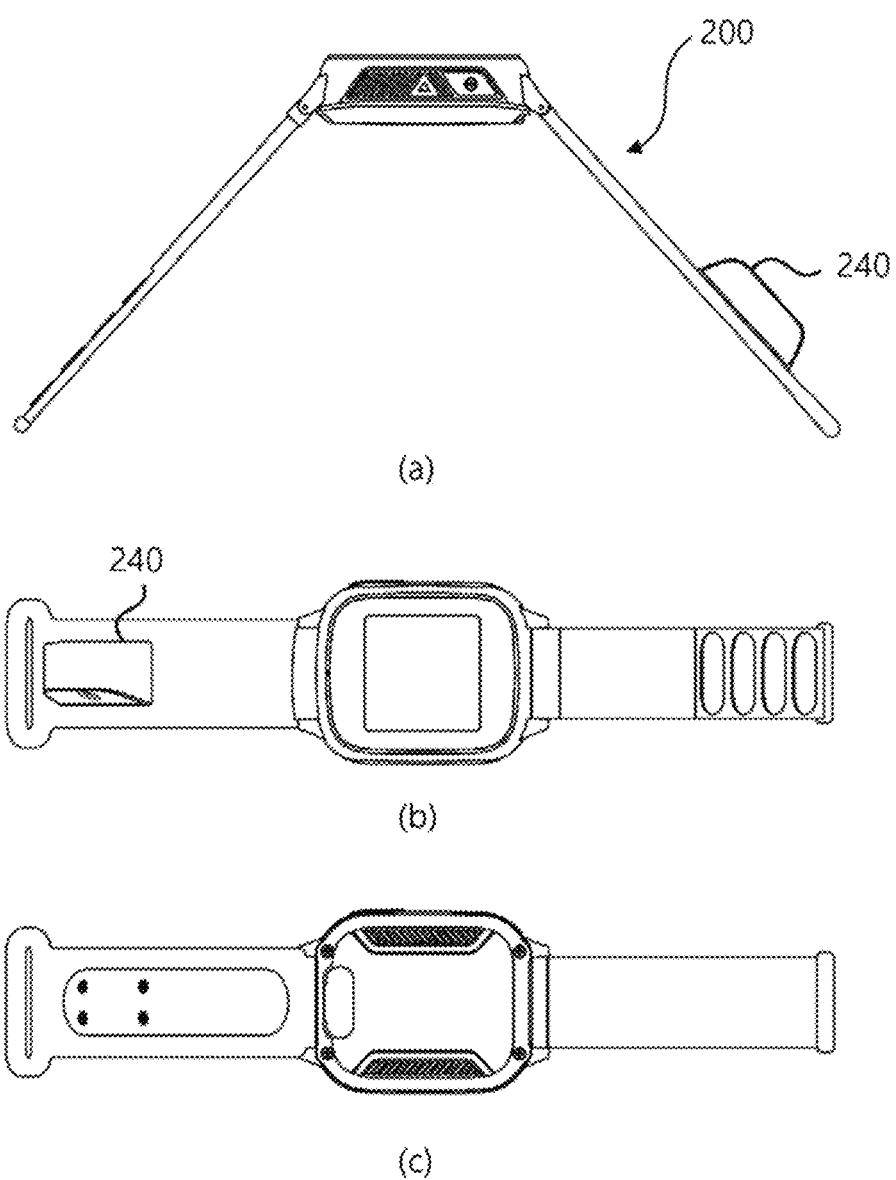
Figure 11:
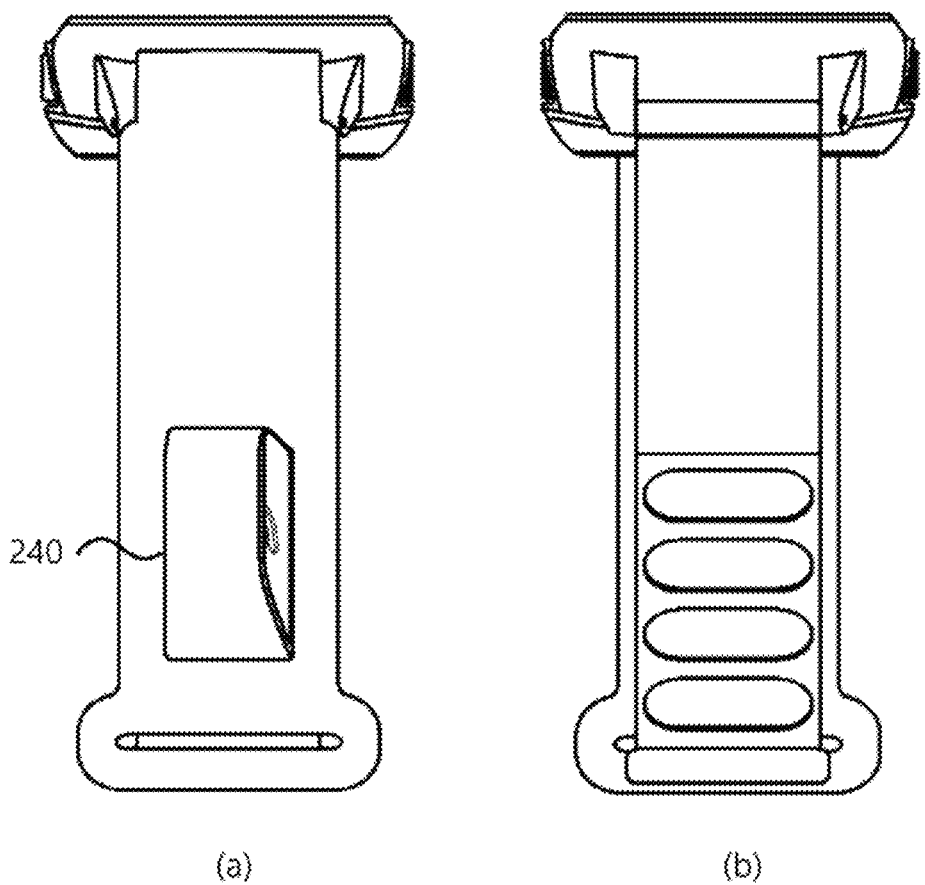

FIGS. 9 to 11 are diagrams illustrating a case in which a wearable device 200 according to an embodiment of the present disclosure is provided in the form of a smart watch.

Referring to FIGS. 9 to 11, the camera module 240 in the smart watch may be formed to be included in the band of the smart watch.

(a) and (b) of FIG. 9 show the perspective view and the front view of the smart watch, respectively. (a), (b), and (c) of FIG. 10 show the rear view, the plan view, and the bottom view of the smart watch, respectively. (a) and (b) of FIG. 11 show the left view and the right view of the smart watch, respectively.

The wearable device 200 disclosed in the present disclosure may be provided in the form of a smart watch as shown in the drawings, or may be provided in the form of a smart band including a camera module.

Steps of a method or algorithm described in connection with the embodiments of the present disclosure may be directly realized by hardware, a software module executed by hardware, or a combination thereof. A software module may reside in random-access memory (RAM), read-only memory (ROM), erasable programmable ROM (EPROM), electrically erasable programmable ROM (EEPROM), flash memory, a hard disk, a removable disk, a CD-ROM, or any other types of computer-readable recording medium well known in the art to which the present disclosure pertains.

Although the embodiments of the present disclosure have been described with reference to the accompanying drawings, it will be understood by those skilled in the art that the present disclosure can be embodied in other specific forms without changing the technical idea or essential characteristics of the present disclosure. Therefore, it should be understood that the embodiments described above are illustrative in all aspects as and not restrictive.

What is claimed is:

1. A monitoring system comprising:
a wireless communication device configured to be attached to an object containing medication, the wireless communication device comprising a motion sensor, an ambient light sensor, a first transceiver, and a first controller; and
a wearable device configured to be worn by a user, the wearable device comprising a camera, and a second controller;
wherein the first controller is configured to:
while the wireless communication device operates in a first state in which the first transceiver is in an inactive state, identify whether motion data obtained from the motion sensor satisfies a first predetermined condition, and
in response to identifying that the motion data satisfies the first predetermined condition, change the first state to a second state in which the first transceiver is in an active state,
while the wireless communication device operates in the second state, identify whether ambient light data obtained from the ambient light sensor satisfies a second predetermined condition,
in response to identifying the ambient light data satisfies the second predetermined condition, transmit, to the wearable device, an activating signal for activating the camera of the wearable device through the first transceiver, the activating signal including the motion data and the ambient light data,
wherein the motion data corresponds to a movement of the object and the ambient light data corresponds to ambient light in an environment surrounding the object,
wherein power consumption of a battery of the wireless communication device is smaller in the first state than in the second state,
wherein the second controller is configured to:
receive the activating signal transmitted from the wireless communication device,
determine whether activating the camera or not based on identifying whether each of a time when the wearable device received the activating signal, the motion data included in received the activating signal, the ambient light data included in received the activating signal, and a received signal strength indicator (RSSI) of the activating signal indicating a distance between the wireless communication device and the wearable device satisfies a third predetermined condition, wherein the camera is activated based on satisfying the first, the second, and the third predetermined conditions, and generate an image or a video using the camera when it is determined to activate the camera.

2. The monitoring system of claim 1,
wherein the motion data includes a motion measurement value,
wherein the motion data satisfies the first predetermined condition when the motion measurement value reaches a first specific value,
wherein the ambient light data includes an ambient light measurement value, and
wherein the ambient light data satisfies the second predetermined condition when the ambient light measurement value reaches a second specific value.

3. The monitoring system of claim 1,
wherein the motion data includes a motion measurement value,
wherein the motion data satisfies the first predetermined condition when a rate of change of the motion measurement value reaches a first specific value,
wherein the ambient light data includes an ambient light measurement value, and
wherein the ambient light data satisfies the second predetermined condition when the ambient light measurement value reaches a second specific value.

4. The monitoring system of claim 1,
wherein the second controller is further configured to determine whether activating the camera or not based on a signal strength, and
wherein the signal strength varies according to a distance between the wearable device and the wireless communication device.

5. The monitoring system of claim 1,
wherein the wearable device further comprises a second transceiver and the second controller obtains the activating signal from the wireless communication device by using the second transceiver.

6. The monitoring system of claim 1,
wherein the wearable device is a smart watch wearable on a wrist of the user, and
wherein the camera is embedded in a part of a band of the smart watch and at least a part of the camera is exposed through a side surface of the band of the smart watch.

7. The monitoring system of claim 1,
wherein the wearable device includes a band wearable on a wrist of the user, the band including a top surface, a bottom surface, and a side surface,
wherein the camera is installed on the top surface of the band, and
wherein an optical axis of a lens of the camera is not parallel to the top surface of the band.

8. The monitoring system of claim 1,
wherein the monitoring system further comprises a server,
wherein the second controller of the wearable device is further configured to transmit the image or the video to the server, and
wherein the server is configured to check medication compliance of the user based on the image or the video.

9. The monitoring system of claim 8,
wherein the server is further configured to determine whether specific actions related with the object or the user is detected,
wherein the specific actions include opening a cover of the object, exposure of medicine, holding the medicine on the user's hand, and bringing the medicine close to the user's mouth.

10. The monitoring system of claim 8,
wherein the wearable device temporarily stores the image or the vide generated by the camera in a situation in which the wearable device fails to access a communication network and transmits the temporarily stored image or vide to the server when the wearable device successes to access the communication network.

* * * * *